United States Patent [19]

No

[11] Patent Number: 5,668,796

[45] Date of Patent: Sep. 16, 1997

[54] DUPLEXING AND SWITCHING SYSTEM AND METHOD IN A MULTIPLEXED SYSTEM

[75] Inventor: Chang-Hyun No, Kyonggi-do, Rep. of Korea

[73] Assignee: Hyundai Electronics Industries Co., Ltd., Rep. of Korea

[21] Appl. No.: 516,296

[22] Filed: Aug. 17, 1995

[30]  Foreign Application Priority Data

Mar. 24, 1995 [KR] Rep. of Korea ............... 95-6426

[51] Int. Cl.$^6$ ............................................. H04J 3/14
[52] U.S. Cl. .................. 370/217; 370/242; 370/244; 370/216; 370/276
[58] Field of Search ..................... 370/16, 13, 17, 370/16.1, 24, 216, 217, 218, 219, 220, 221, 222, 223, 224, 225, 226, 227, 228, 241, 242, 243, 244, 245, 246, 247, 250, 251, 252, 276

[56]  References Cited

U.S. PATENT DOCUMENTS 3,303,474  2/1967  Moore et al. ................. 370/16
4,228,535  10/1980  Workman et al. ............. 370/16
4,891,694  1/1990  Way.

FOREIGN PATENT DOCUMENTS 4-284741  10/1992  Japan.

*Primary Examiner*—Wellington Chin
*Assistant Examiner*—Huy D. Vu
*Attorney, Agent, or Firm*—David M. Klein; Bryan Cave LLP

[57]  ABSTRACT

In a switching system and method in a multiplexed system, the multiplexed system is kept in continuous normal operation by duplexing of functions and by switching to a non-failure side when the multiplexed system partially fails. The system includes control registers for storing and generating control information on both sides, and state registers for storing and generating information on the defective location and the cause of the defect. With the information in the control registers, the system checks for trouble, and switches to a non-faulty side when trouble is detected. With the information in the state registers, the cause of the trouble is analyzed and stored.

2 Claims, 5 Drawing Sheets

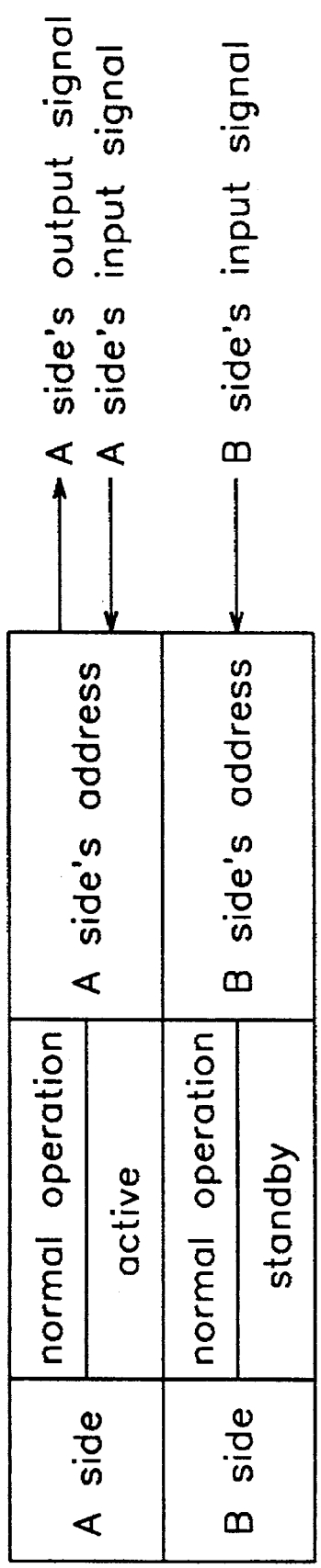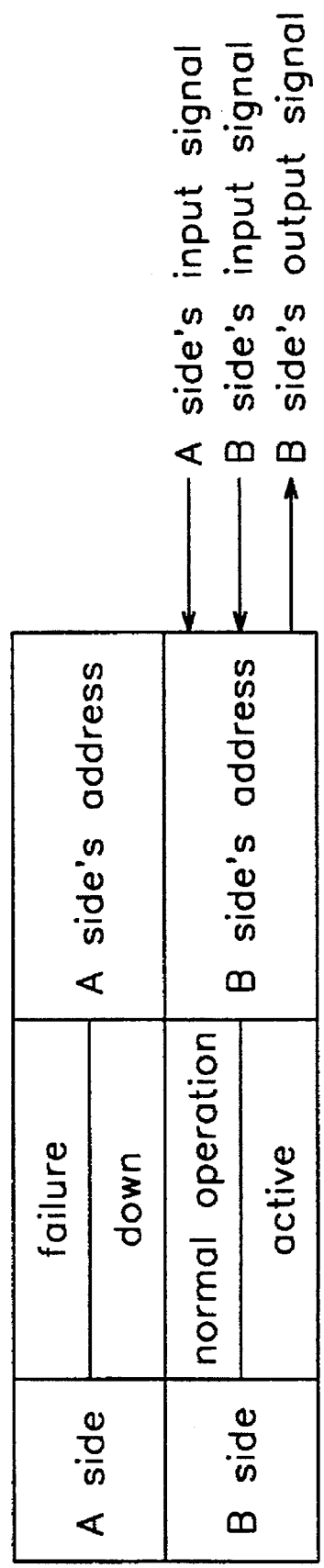

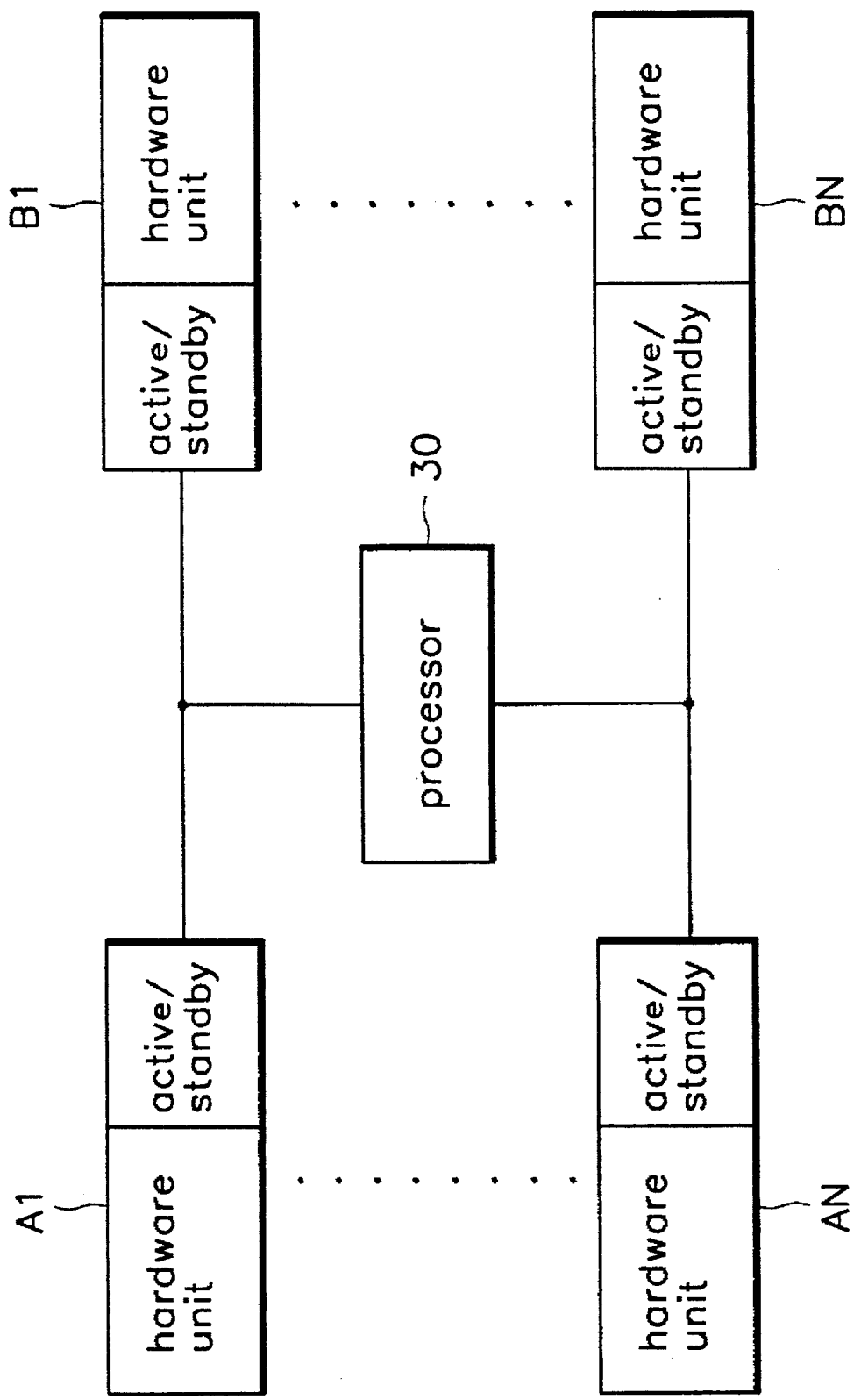

DUPLEXING AND SWITCHING SYSTEM AND METHOD IN A MULTIPLEXED SYSTEM

BACKGROUND OF THE INVENTION

This invention relates to a duplexing and switching system and method in a multiplexed system consisting of multiprocessors, wherein the multiplexed system is kept in continuous normal operation by duplexing of functions and by high speed switching to a non-failure side when the multiplexed system is out of order.

In general, optical cable television systems, mobile communication systems and video on demand systems operate duplexly in "A" and "B" directions. In addition, in such systems, high speed switching to a non-failure side is performed when troubles occur.

Typically, for such functions, the "A" and "B" sides check their counterpart's state when switching to the non-failure side. That is, "A" side checks "B" side's state continuously and "B" side checks "A" side's state continuously for discriminating whether troubles occur and switching to a counterpart when troubles occur. For A and B sides to check their counterpart's state, information on the counterpart is stored in a register or memory at predetermined regions. A processor accesses the information at the regions by polling and process the failure state.

The conventional art uses very expensive complicated hardware such as processors and peripheral circuits. In addition, such hardware can not be controlled by units or groups, thus making it difficult to apply to multisystems.

SUMMARY OF THE INVENTION

An object of the present invention is to provide a duplexing and switching system and method of active/standby mode in multiplexed systems, wherein a counterpart's state, defective location and contents are checked, and high speed switching is performed.

According to the duplexing and switching system and method of active/standby mode of the present invention, state registers and control registers are provided at both sides. Control registers store and generate control information on both sides. State registers store and generate information on defective location and cause.

With the information stored in control registers, it is checked whether one side is "A" side or "B" side for establishing an active or standby state. When trouble occurs, high speed switching to a counterpart is performed, and the cause of trouble is analyzed and stored in the state registers.

Therefore, according to the present invention, a counterpart is checked and a defective location and contents will be checked when troubles occur, so that processing speed will be increased substantially and the required hardware will be very simple.

BEEF DESCRIPTIONS OF THE DRAWINGS

Other objects of the present invention will become apparent from the following description in conjunction with the drawings, in which:

FIG. 1A is a diagram of the duplexing and switching system and method of the present invention, showing signal processing when both sides operate normally;

FIG. 1B is a diagram of the duplexing and switching system and method of active/standby mode of the present invention, showing signal processing when one side is out of order and switching to a counterpart is performed;

FIG. 5 is a block diagram showing switching between Side A and Side B by means of a processor.

DETAILED DESCRIPTION OF THE INVENTION

FIG. 1A is a diagram of the duplexing and switching system and method of the present invention, showing signal processing when the "A" and "B" sides operate normally. FIG. 1B is a diagram of the duplexing and switching system and method of the present invention, showing signal processing when the "A" side is out of order and switching to a counterpart is performed.

As shown in FIG. 1A, when the duplexing system is in normal operation, it operates with both "A" and "B" sides. In this condition, provided that the "A" side is in active state and the "B" side is in standby state, input signals are applied to both the "A" and "B" sides. However, only the "A" side generates output signals. The "B" side does not generate output signals but maintains the present state. That is, a predetermined signal is generated from the "A" side which is in an active state, but not generated from the "B" side which is in a standby state.

As shown in FIG. 1B, in which the "A" side in the active state is out of order (DOWN), signals being applied to the "A" side are switched to the "B" side, which makes the "B" side into an active state and generate output signals. That is, when the "A" side in an active state becomes out of order, the "B" side in a standby state changes to an active state and operates. Accordingly, the system is in continuous normal operation.

Figure 2:
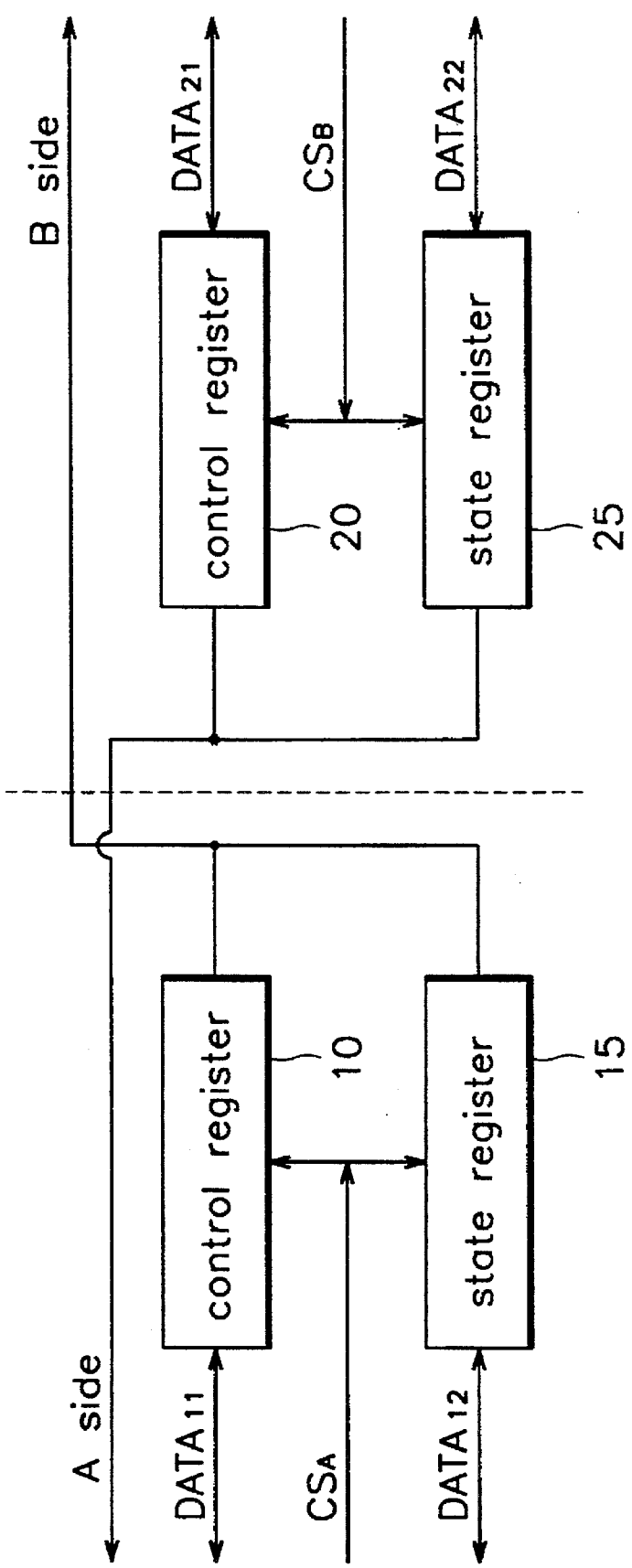
FIG. 2 shows the construction of the duplexing and switching system of the present invention.

FIG. 2 shows the construction of the duplexing and switching system of the present invention. As shown in FIG. 2, the duplexing and switching system comprises control registers 10, 20 for receiving, storing and generating control information on one side and its counterpart through data buses (DATA11, DATA21) according to control signals (CSA, CSB) (CSA, CSB) of that side's, and state registers 15, 25 for receiving, storing and generating information on trouble location cause through data buses (DATA12, DATA22) according to control signals (CSA) of that side's. The system receives information in the control registers 10, 20 according to the control signals (CSA, CSB) and checks whether the one side is "A" side or "B" side, thus establishing active or standby state. When troubles occur, switching to a counterpart is performed. According to the control signals (CSA, CSB), the system receives the information in the state registers 15, 25, and analyzes and store cause of trouble.

Figure 3A:
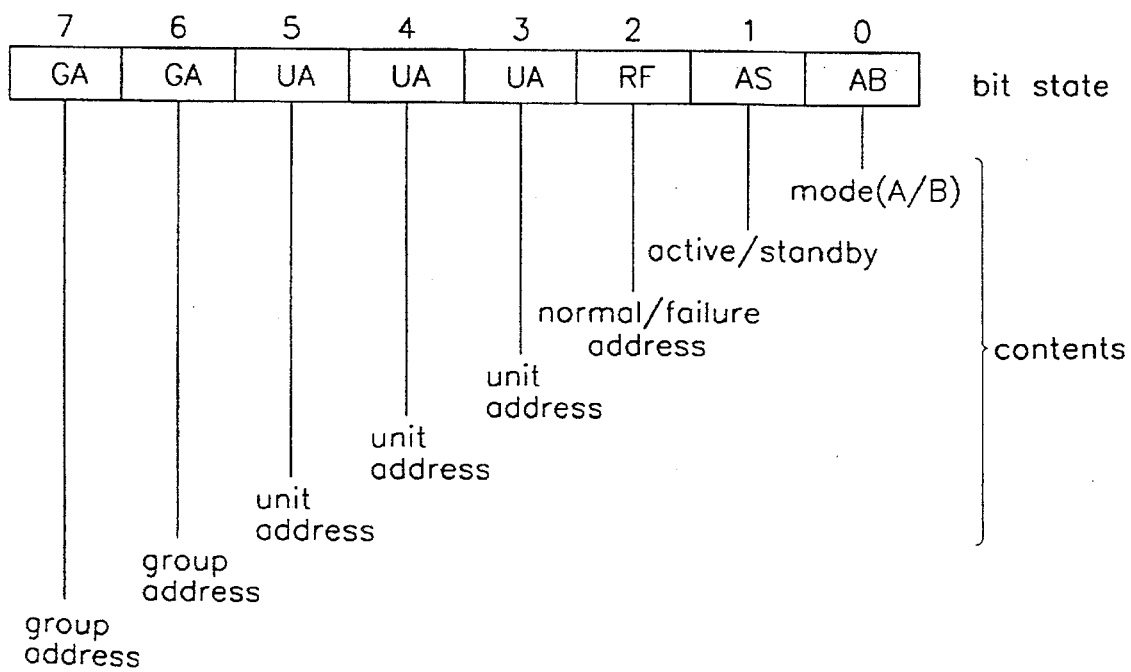
FIGS. 3A and 3B show the bits of the control registers and state registers of FIG. 2.

The control registers 10, 20, as shown in FIG. 3, stores in the "0" bit (AB) the information on whether the one side is "A" side or "B" side. Information on whether the one side is in active state or standby state is stored in the "1" bit (AS). Information on whether the one side is in normal operation or out of order is stored in "2" bit (RF). Unit addresses and group addresses for checking the state of units and groups and for confirming units between another system in a multiplexed system are stored in the "3", "4", "5" bits (UA) and "6", "7" bits (GA)

Figure 3B:
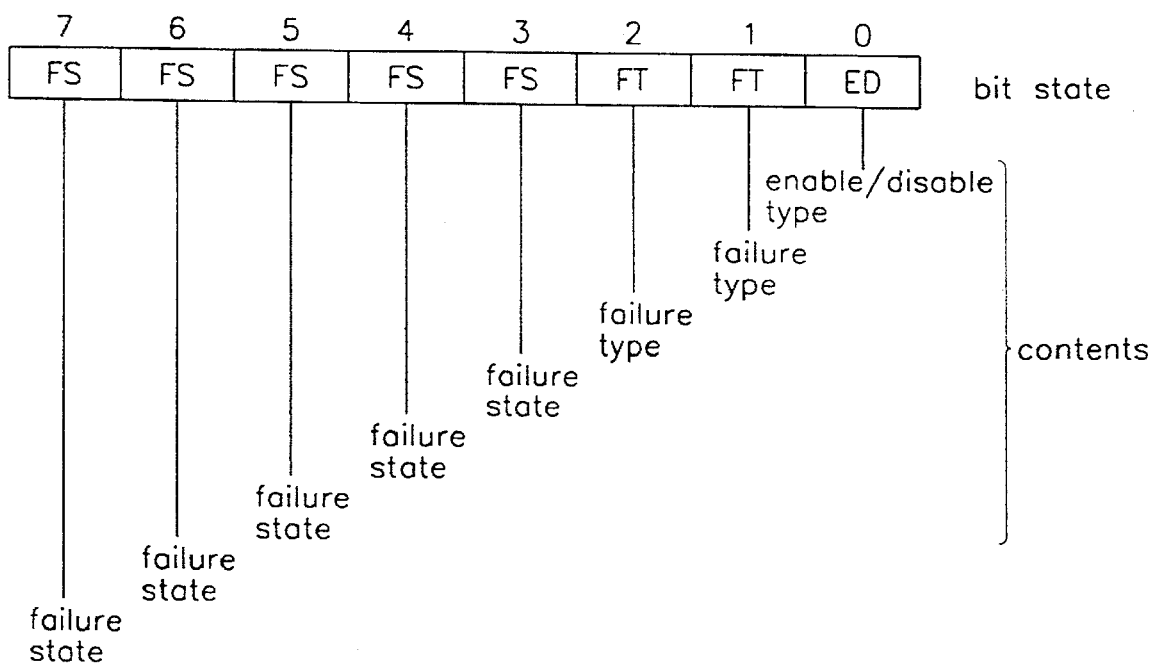

The state registers 15, 25, as shown in FIG. 3B, store in the "0" bit (ED) information on whether the present state is enable or disable. In the "1", "2" bits (FT), and "3", "4", "5", "6", "7" bits (FS) are respectively stored information on trouble occurring, i.e., trouble type and trouble condition.

Figure 4:
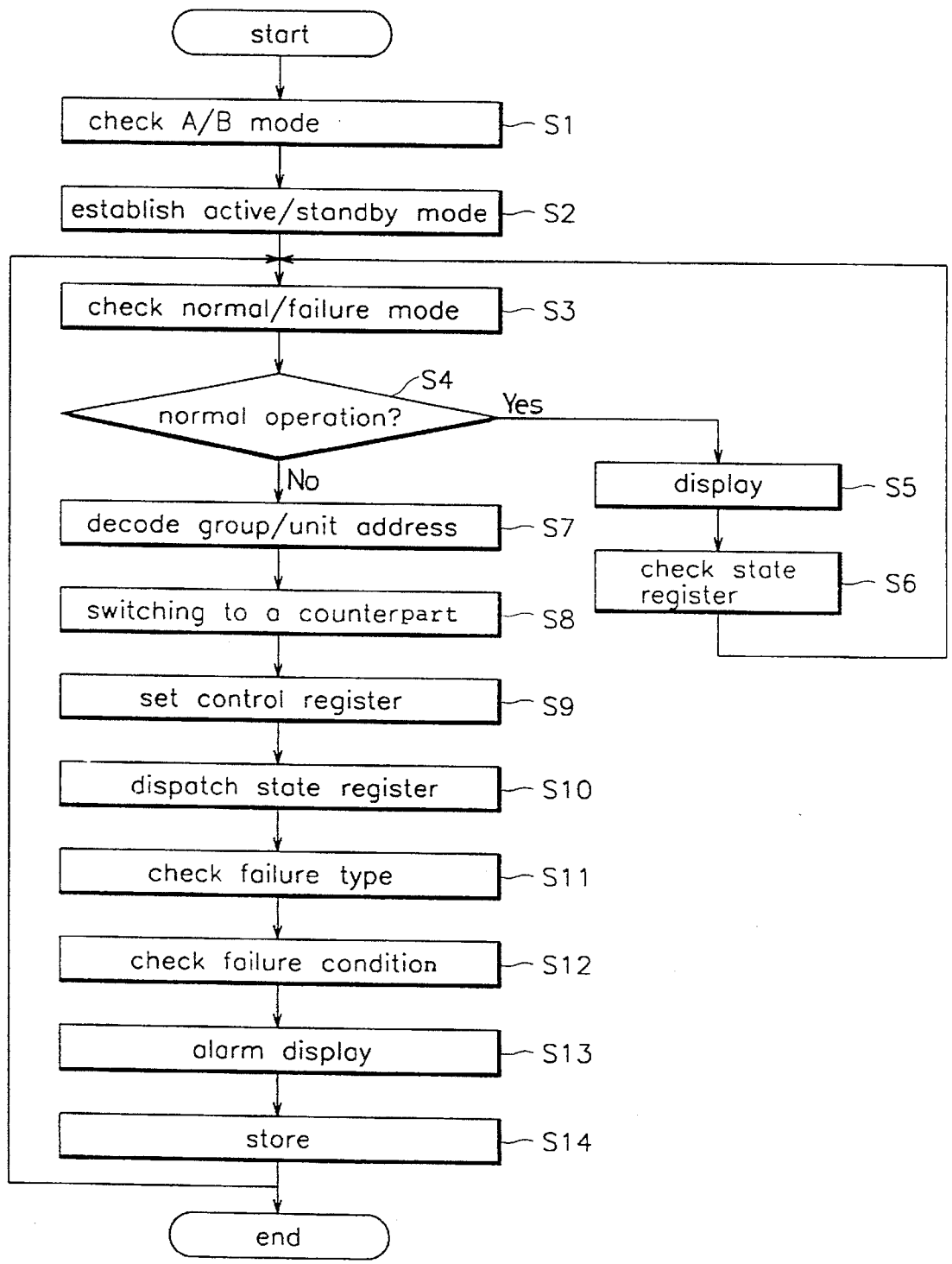
FIG. 4 is a flow chart showing the duplexing and switching system of the present invention.

FIG. 4 is a flow chart showing the duplexing and switching system of the present invention, utilizing control registers 10, 20 and state registers 15, 25. As shown in FIG. 4, the "0" bit (AB) stored in both side control registers 10, 20 checks whether the one side is "A" side or "B" side (step S1). According to the content of the "1" bit (AS), that side is established as being in an active state or standby a state (step S2).

The side in active state checks for a normal or faulty state by means of the "2" bit (RF) of control registers 10, 20 (step S3). If normal state (Run) (step S4) is checked, the normal state is represented (step S5). Thereafter, the contents of the state registers (15) (25) are checked (step S6). Then, a normal or faulty state is checked for by means of the "2" bit (RF) of the control registers (step S3).

In step S4, if a faulty state is checked, the unit and group addresses of "3", "4", "5" bits (UA), and "6", "7" bits of the control registers 10, 20 are decoded (step S7). Thereafter, switching to a counterpart represented by the unit and group addresses is performed (step S8).

The "1" bit (AS) of the counterpart's control registers 10, 20 in the standby state is set to the active state (step S9).

For identifying trouble cause of faulty side, state registers 15, 25 of the faulty side are dispatched (step S10). Information on the type and condition of the trouble is stored in the "1", "2" bits (FT) and the "3", "4", "5", "6", "7" bits (FS) of the state registers 15, 25 are checked (steps S11, S12). Thereafter, the trouble cause is displayed (step S13) and the state is stored for being restored thereafter (step S14).

As shown in FIG. 5, application of the present invention to a multiplexed system will result in switching between system A side (A1~AN) and B side (B1~BN) by means of the processor 30.

As described-above, the duplexing and switching system and method of using an active/standby mode in a multiplexed system according to the present invention enables proper switching by the location of the unit to be switched and storage of trouble information. Furthermore, the construction of hardware for duplexing in a multiplexed system is simplified, thus decreasing manufacturing cost. In addition, application of the present invention to large-sized systems is possible by utilizing unit address and group address modes.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A duplexing and switching system for use in a multiplexed system comprising:

a) control registers (10, 20) for storing and generating control information on both "A" and "B" sides of the system, the control registers storing and generating i) information on whether a particular side is an "A" side or "B" side, ii) information on whether the particular side is in an active state or a standby state, iii) information on whether the particular side is in normal or abnormal operation, and iv) unit addresses and group addresses for checking the state of units and groups, and identifying units between other systems; and b) state registers (15, 25) for storing and generating information on defective locations and the causes for such defects;

whereby in the control registers, "A" side or "B" side is checked, active or standby status is established, and switching to a counterpart's side is performed when a faulty state is identified, and whereby trouble causes are analyzed and stored by the information in the state registers.

2. A duplexing and switching method for use in a multiplexed system comprising the steps of:

(a) checking whether a particular side is an "A" side or a "B" side and setting the particular side to an active state and the other side to a standby state;

(b) determining whether the side set to the active state in step (a) is in normal operation;

(c) if normal operation is determined in step (b), representing the normal operation and performing step (b) repeatedly;

(d) if abnormal operation is detected in step (b), using the unit addresses and group addresses to switch to a counterpart of the side with the faulty condition, and resetting the counterpart to an active state; and (e) dispatching state register in faulty state, analyzing, representing and storing the type and condition of failure.

* * * * *